Patented Dec. 13, 1927.

1,652,573

UNITED STATES PATENT OFFICE.

HERBERT JOHN MALLABAR, OF WATFORD, ENGLAND.

MANUFACTURE OF CELLULOSE ACETATE.

No Drawing.  Application filed June 29, 1925.  Serial No. 40,460.

This invention relates to an improved method of producing cellulose acetate and to a new or improved cellulose acetate.

The methods hitherto in use for the production of cellulose acetate have comprised, in general, the acetylation of cellulose, hydrated or not, by means of acetic anhydride in presence of a condensing agent. As condensing agents zinc chloride or sulphuric acid have been most generally employed.

The cellulose acetates produced by the aid of zinc chloride are insoluble in acetone and therefore inconvenient and expensive solvents such as chloroform are required for their solution. Using sulphuric acid as condensing agent, cellulose acetates soluble in acetone may be directly produced but the products so obtained have always hitherto contained traces of sulphuric acid which have a detrimental effect on the cellulose acetate and cause brittleness.

One of the objects of the present invention is to produce a cellulose acetate having improved properties and it has been found possible to make a product which is soluble in acetone and contains no sulphuric acid. Another object is to provide a cellulose acetate insoluble in chloroform but soluble in acetone and possessing much better lasting qualities. The invention includes the process of preparing such cellulose acetate. This process may be carried out in effect in a single operation although such operation is conducted in separate stages. It is possible to maintain the cellulose in solution during all the operations and finally precipitate a cellulose acetate soluble in acetone and containing no sulphuric acid.

The preferred process according to the present invention consists in treating cellulose in the cold with excess of acetic acid containing a small proportion of sulphuric acid in the cold, then adding a solution in acetic acid of sufficient alkali acetate to convert the sulphuric acid to alkali sulphate, then acetylating with acetic anhydride at 30°–40° C. in presence of a limited quantity of zinc chloride and finally treating the solution so formed with water at about 100° C. until a test sample yields a cellulose acetate soluble in acetone. The celluose acetate may be precipitated before the addition of water and separately treated to obtain solubility in acetone or other desired solvent. An important feature of the process is the acetylation at a moderate temperature using a limited quantity of zinc chloride, e. g. 15 to 25 parts per 100 parts of cellulose in presence of about 850 to 1000 parts of acetic acid.

When acetylation takes place in the presence of strong acid (for example sulphuric acid) there is a fixation of acid in the cellulose molecule, and it is difficult to completely remove this even if the acid is neutralized with sodium acetate after the acetylation has been performed. As a result, with most of the commercial acetates at present known, a charring takes place when they are heated.

This is not the case when zinc chloride is used as the catalyst. If however, this body is used on normal celluloses, quantities of about 50% are required for satisfactory reaction, and prolonged treatment at temperatures of about 50° C. or higher.

In the present process, the preliminary treatment with the sulphuric acid does not result in fixation of the acid on the cellulose as this takes place only during the process of acetylation, that is, in the presence of acetic anhydride. Therefore neutralization with sodium acetate exerts a novel effect when performed at this stage of the process.

The treatment renders it possible to work with smaller quantities of zinc chloride, say 20 to 25% and at a lower temperature, say 35° C.

Sulphuric acid not having entered into combination with the cellulose, there is obtained a stronger acetate which contains no fixed acid residues and which will not therefore char when heated, and is more stable under ordinary conditions.

The following example shows how the invention may be carried out:

*Example.*

1. 100 parts cellulose are treated with 400 parts acetic acid containing from 2 to 5 parts of sulphuric acid. This is allowed to stand cold for 24 hours.

2. Add to the above 200 parts acetic acid containing sodium acetate equivalent to convert the sulphuric acid and converting it into sodium sulphate. Then add further 200 parts acetic acid containing from 15 to 25 parts zinc chloride (ZnCl₂) and finally 250 to 400 parts of acetic anhydride. The temperature is now raised to 30°–40° C. and maintained at 20°–40° C. until acetylation is complete.

3. The acetate may be precipitated directly, and subsequently treated to obtain solubility in acetone or other solvents; or from 40 to 100 parts of water per 100 of original cellulose may be added to the reaction mixture and the temperature raised to about 100° C. The mixture is maintained at this temperature until a test sample shows the desired solubility in acetone to have been reached.

If the primary acetate is precipitated and air dried it may be dissolved in acetic acid and converted to the acetone soluble form by the addition of from 40–100 parts of water and heating at 100° C.

Successive, as distinct from separate, use of sulphuric acid and then of zinc chloride, preferably with the interpolation of the step of neutralization is considered to be broadly novel.

It is also considered broadly novel to interpolate a neutralization step between a preliminary treatment and an acetylation stage.

The term "neutralization" is used in this specification to refer to the elimination of free sulphuric acid as such by causing it to react with the salt of a weaker acid so as to form a sulphate and liberate the said weaker acid.

I declare that what I claim is:

1. Process of preparing cellulose acetate in which cellulose is preliminarily treated with acetic acid containing a small proportion of sulphuric acid in the cold and subsequently acetylated with the aid of a relatively small proportion of zinc chloride at a moderate temperature.

2. Process of preparing cellulose acetate in which cellulose is preliminarily treated with acetic acid containing a small proportion of sulphuric acid in the cold, subsequently acetylated with the aid of a relatively small proportion of zinc chloride at a moderate temperature and finally hydrolyzed until a test portion shows solubility in acetone.

3. Process of preparing cellulose acetate in which cellulose is preliminarily treated with acetic acid containing a small proportion of sulphuric acid in the cold, then acetylating with acetic anhydride in presence of a relatively small proportion of zinc chloride at a moderate temperature.

4. Process of preparing cellulose acetate in which cellulose is preliminarily treated with acetic acid containing a small proportion of sulphuric acid in the cold, the sulphuric acid neutralized and the mixture acetylated with the aid of a relatively small proportion of zinc chloride at a moderate temperature.

5. Process of preparing cellulose acetate in which cellulose is preliminarily treated with acetic acid containing a small proportion of sulphuric acid at room temperature and subsequently acetylated with the aid of a relatively small proportion of zinc chloride at 20°–40° C.

6. Process of preparing cellulose acetate in which cellulose is preliminarily treated with acetic acid containing a small proportion of sulphuric acid in the cold, subsequently acetylated with the aid of a relatively small proportion of zinc chloride at a moderate temperature and finally hydrolyzed by adding water and heating until a test portion shows solubility in acetone.

7. Process of preparing cellulose acetate in which cellulose is preliminarily treated with acetic acid containing a small proportion of sulphuric acid in the cold subsequently acetylated with the aid of a relatively small proportion of zinc chloride at a moderate temperature and finally hydrolyzed by adding water and maintaining the mixture at about 100° C. until a test portion shows solubility in acetone.

8. Process of preparing cellulose acetate in which cellulose is preliminarily treated with acetic acid containing a small proportion of sulphuric acid at room temperature subsequently acetylated with the aid of a relatively small proportion of zinc chloride at 20°–40° C. and finally hydrolyzed by maintaining the mixture at about 100° C. with added water until a test portion shows solubility in acetone.

9. Process of preparing cellulose acetate in which cellulose is preliminarily treated with acetic acid containing a small proportion of sulphuric acid in the cold, the sulphuric acid neutralized, the mixture acetylated with the aid of a relatively small proportion of zinc chloride at a moderate temperature, and finally hydrolyzed by adding water and heating until a test portion shows solubility in actone.

10. Process of preparing cellulose acetate in which cellulose is preliminarily treated with acetic acid containing a small proportion of sulphuric acid in the cold, then acetylated with acetic anhydride in presence of a relatively small proportion of zinc chloride at a moderate temperature and finally hydrolyzed by adding water and heating until a test portion shows solubility in acetone.

11. Process of preparing cellulose acetate in which cellulose is preliminarily treated with acetic acid containing a small proportion of sulphuric acid at room temperature and subsequently acetylated with acetic anhydride in presence of a relatively small proportion of zinc chloride at 20°–40° C.

12. Process of preparing cellulose acetate in which cellulose is preliminarily treated with acetic acid containing a small proportion of sulphuric acid in the cold the sulphuric acid neutralized by the addition of an alkali acetate and the mixture acetylated with the aid of a relatively small proportion of zinc chloride at a moderate temperature.

13. Process of preparing cellulose acetate in which cellulose is preliminarily treated with acetic acid containing a small proportion of sulphuric acid at room temperature, the sulphuric acid neutralized and the mixture acetylated with the aid of a relatively small proportion of zinc chloride at 20°–40° C.

14. Process of preparing cellulose acetate in which cellulose is preliminarily treated with acetic acid containing a small proportion of sulphuric acid in the cold, the sulphuric acid neutralized, the mixture acetylated with the aid of a relatively small proportion of zinc chloride at a moderate temperature and finally hydrolyzed, until a test portion shows solubility in acetone.

15. A process for acetylation of cellulose in which the cellulose is successively treated with sulphuric acid in presence of acetic acid and with zinc chloride.

16. In the acetylation of cellulose the successive use of sulphuric acid in presence of acetic acid and of zinc chloride with the interpolation of a step for the neutralization of the sulphuric acid.

17. In the acetylation of cellulose, subjecting the cellulose to low temperature treatment with sulphuric acid in acetic acid, neutralizing the sulphuric acid, acetylating at moderate temperature by addition of acetic anhydride and zinc chloride, and hydrolyzing by heating with water until a test portion shows solubility in acetone, all while avoiding precipitation of cellulose acetate from the reaction mixture.

18. Process of preparing cellulose acetate in which cellulose is preliminarily treated with acetic acid containing a small proportion of sulphuric acid in the cold, the sulphuric acid neutralized by the addition of alkali metal acetate and subsequently acetylated with a relatively small proportion of zinc chloride at a temperature of 20° to 40° C.

19. Process of preparing cellulose acetate in which the cellulose is preliminarily treated with acetic acid containing a small proportion of sulphuric acid, the sulphuric acid neutralized, and the mixture then subjected to the main acetylation process with the aid of zinc chloride.

In witness whereof, I have hereunto signed my name this 15th day of June, 1925.

HERBERT JOHN MALLABAR.